United States Patent
Yang et al.

(10) Patent No.: US 10,901,698 B2
(45) Date of Patent: Jan. 26, 2021

(54) COMMAND TOOL DEVELOPMENT USING A DESCRIPTION FILE

(71) Applicant: International Business Machines Corporation, Armonk, NY (US)

(72) Inventors: Kun Yang, Beijing (CN); Jun Li Wang, Bellevue, WA (US); Yu Zhuang, Beijing (CN); Hongling Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/205,339

(22) Filed: Nov. 30, 2018

(65) Prior Publication Data
US 2020/0174754 A1    Jun. 4, 2020

(51) Int. Cl.
G06F 9/44 (2018.01)
G06F 8/30 (2018.01)

(52) U.S. Cl.
CPC .................... *G06F 8/30* (2013.01)

(58) Field of Classification Search
CPC .............. G06F 8/30–8/31; G06F 8/311–8/313
USPC .................................. 717/106–114
See application file for complete search history.

(56) References Cited

U.S. PATENT DOCUMENTS

| | | | | |
|---|---|---|---|---|
| 5,507,030 A * | 4/1996 | Sites | ......................... | G06F 8/30 712/E9.028 |
| 5,517,658 A * | 5/1996 | Gluss | ................. | G06F 30/3312 716/108 |
| 5,600,579 A * | 2/1997 | Steinmetz, Jr. | ......... | G06F 30/33 703/13 |
| 5,630,131 A * | 5/1997 | Palevich | ................. | G06F 9/454 717/108 |
| 5,675,805 A * | 10/1997 | Boldo | ....................... | G06F 8/30 717/114 |
| 5,802,370 A * | 9/1998 | Sitbon | ................. | G06F 9/45512 715/803 |
| 5,819,261 A * | 10/1998 | Takahashi | ............... | G06F 16/40 |
| 5,960,200 A * | 9/1999 | Eager | ..................... | G06F 8/427 703/13 |
| 6,170,081 B1 * | 1/2001 | Fontana | .................... | G06F 8/20 707/999.01 |

(Continued)

OTHER PUBLICATIONS

Qi et al, "Efficient Gerber File Parsing and Drawing", ACM, pp. 13-17 (Year: 2018).*

(Continued)

*Primary Examiner* — Anil Khatri
(74) *Attorney, Agent, or Firm* — Robert J. Shatto

(57) ABSTRACT

Embodiments of the present disclosure relate to a computer-implemented method for executing one or more operations based on a command. According to the method, a command is received. A command name of the command and one or more parameters of the command are extracted. A command description file corresponding to the command is retrieved based on the command name. The command description file describes function logic of the command. The retrieved command description file is parsed, and information for executing one or more operations included in the command description file is acquired. The one or more operations are executed based on the acquired information and the one or more parameters.

18 Claims, 9 Drawing Sheets

(56) References Cited

U.S. PATENT DOCUMENTS

| | | | | |
|---|---|---|---|---|
| 6,237,136 | B1* | 5/2001 | Sadahiro | G06F 8/10 |
| | | | | 717/110 |
| 6,421,822 | B1* | 7/2002 | Pavela | G06F 11/3664 |
| | | | | 714/E11.208 |
| 6,658,646 | B1 | 12/2003 | Hernandez, III | |
| 6,851,105 | B1* | 2/2005 | Coad | G06F 8/20 |
| | | | | 717/106 |
| 6,978,440 | B1* | 12/2005 | Pavela | G06F 11/3664 |
| | | | | 714/E11.208 |
| 6,990,654 | B2* | 1/2006 | Carroll, Jr. | G06F 8/38 |
| | | | | 715/234 |
| 7,000,218 | B2* | 2/2006 | Gerken | G06F 8/30 |
| | | | | 717/106 |
| 7,222,313 | B2* | 5/2007 | Bullis | H04L 41/0803 |
| | | | | 710/8 |
| 7,228,499 | B1 | 6/2007 | Taira | |
| 7,284,233 | B2* | 10/2007 | Sengodan | G06F 40/117 |
| | | | | 717/102 |
| 7,437,710 | B2* | 10/2008 | Bau, III | G06F 8/20 |
| | | | | 717/109 |
| 7,454,743 | B2* | 11/2008 | Fuchs | G06F 9/44505 |
| | | | | 717/106 |
| 7,603,444 | B2* | 10/2009 | Bullis | H04L 43/00 |
| | | | | 709/220 |
| 7,849,439 | B2* | 12/2010 | Green | G06F 8/74 |
| | | | | 717/105 |
| 8,347,265 | B1 | 1/2013 | Sirianni | |
| 8,359,606 | B2 | 1/2013 | Odins-Lucas et al. | |
| 8,707,252 | B1* | 4/2014 | Alexeev | G06F 9/45512 |
| | | | | 717/104 |
| 8,954,869 | B2 | 2/2015 | Courteaux | |
| 8,954,870 | B2* | 2/2015 | Martin | G06F 8/38 |
| | | | | 715/763 |
| 9,043,759 | B1* | 5/2015 | Lininger | G06F 11/3684 |
| | | | | 717/124 |
| 9,344,524 | B2 | 5/2016 | Arnault | |
| 9,513,941 | B2 | 12/2016 | Feng | |
| 9,798,522 | B2 | 10/2017 | Strachota | |
| 2004/0040016 | A1 | 2/2004 | Pearce | |
| 2004/0237036 | A1 | 11/2004 | Qulst | |
| 2017/0109356 | A1 | 4/2017 | Sawal | |

OTHER PUBLICATIONS

Mashey, "Using a Command Language as a High-Level Programming Language", ACM, pp. 169-176 (Year: 1976).*

Suter et al, "Inferring Web API Descriptions From Usage Data", IEEE, pp. 7-12 (Year: 2015).*

Faloutsos et al, Description and Performance Analysis of Signature File Methods for Office Filing, ACM, pp. 237-257 (Year: 1987).*

Pandita et al, "Inferring Method Specifications from Natural Language API Descriptions", IEEE, pp. 815-825 (Year: 2012).*

Verborgh et al, "Functional Descriptions as the Bridge between Hypermedia APIs and the Semantic Web", ACM, pp. 33-40 (Year: 2012).*

Chukhajyan, "Automated Generation of Core Test Description File for Hierarchical Test", IEEE, pp. 1-4 (Year: 2016).*

Boehm et al, "A Spiral Model of Software Development and Enhancement", IEEE, pp. 61-72 (Year: 1988).*

Davis et al, "A Strategy for Comparing Alternative Software Development Life Cycle Models", IEEE, pp. 1453-1461 (Year: 1988).*

Kastner et al, " Feature IDE: A Tool Framework for Feature-Oriented Software Development", IEEE, pp. 611-614 (Year: 2009).*

Li et al, "Design and Evaluation of a Command Recommendation System for Software Applications", ACM, pp. 1-35 (Year: 2011).*

Stelovsky et al, "A System for Specification and Rapid Prototyping of Application Command Languages", IEEE, pp. 1023-1032 (Year : 1988).*

Watkins, "A Technique for Testing Command and Control Software", ACM, pp. 228-232 (Year: 1982).*

"AWS Command Line Interface", © 2018, Amazon Web Services, Inc., 8 pages, <https://aws.amazon.com/cli/>.

"Azure CLI", Microsoft, Oct. 9, 2018, 1 page, <https://docs.microsoft.com/en-us/cli/azure/index?view=azure-cli-latest>.

"Essential Tools for Cloud Platform", Cloud SDK | Google Cloud, last printed Oct. 10, 2018, 6 pages, <https://cloud.google.com/sdk/>.

"Getting started with the IBM Cloud CLI", Last Updated: Oct. 3, 2018, 3 pages, <https://console.bluemix.net/docs/cli/index.html#overview>.

"IBM Cloud CLI Plug-in Repository", IBM, last printed Oct. 10, 2018, 4 pages, <https://plugins.ng.bluemix.net/ui/repository.html>.

"OpenAPI-Specification: The OpenAPI Specification Repository", GitHub—OAI, last printed Oct. 10, 2018, 3 pages, <https://github.com/OAI/OpenAPI-Specification>.

"Rest API & Command Line Interface", Apprenda, last printed Jan. 17, 2018, 3 pages, <https://apprenda.com/platform/features/rest-api-command-line-interface/>.

"The Best APIs are Built with Swagger Tools", Swagger, SmartBear Software, last printed Oct. 10, 2018, 5 pages, (https://swagger.io/>.

Mell et al., "The NIST Definition of Cloud Computing", National Institute of Standards and Technology, Special Publication 800-145, Sep. 2011, 7 pages.

* cited by examiner

COMMAND TOOL DEVELOPMENT USING A DESCRIPTION FILE

BACKGROUND

The present disclosure general relates to software development and more specifically, to command tool development.

A command tool is usually provided to users to perform some functions. A command may be a string of text used to perform one or more corresponding operations. The command tool may use a command to produce a request to perform an identified function (e.g., API method) to be executed on a specified resource (e.g., API resource) with the specified values of one or more parameters (e.g., API parameters). For example, "ping 181.156.0.1" is a command instance that directs a computer system to send a generic message on a network to another computer system at the IP address 181.156.0.1 to test network connectivity between the two computer systems.

SUMMARY

Embodiments of the present disclosure disclose a method, a system, and computer program product. According to some embodiments of the present disclosure, a command is received. A command name of the command and one or more parameters of the command are extracted. A command description file corresponding to the command is retrieved based on the command name. The command description file describes function logic of the command. Information for executing one or more operations included in the command description file is acquired by parsing the retrieved command description file. The one or more operations are executed based on the acquired information and the one or more parameters.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Through the more detailed description of some embodiments of the present disclosure in the accompanying drawings, the above and other objects, features, and advantages of the present disclosure will become more apparent, wherein the same reference generally refers to the same components in the embodiments of the present disclosure.

Figure 1:
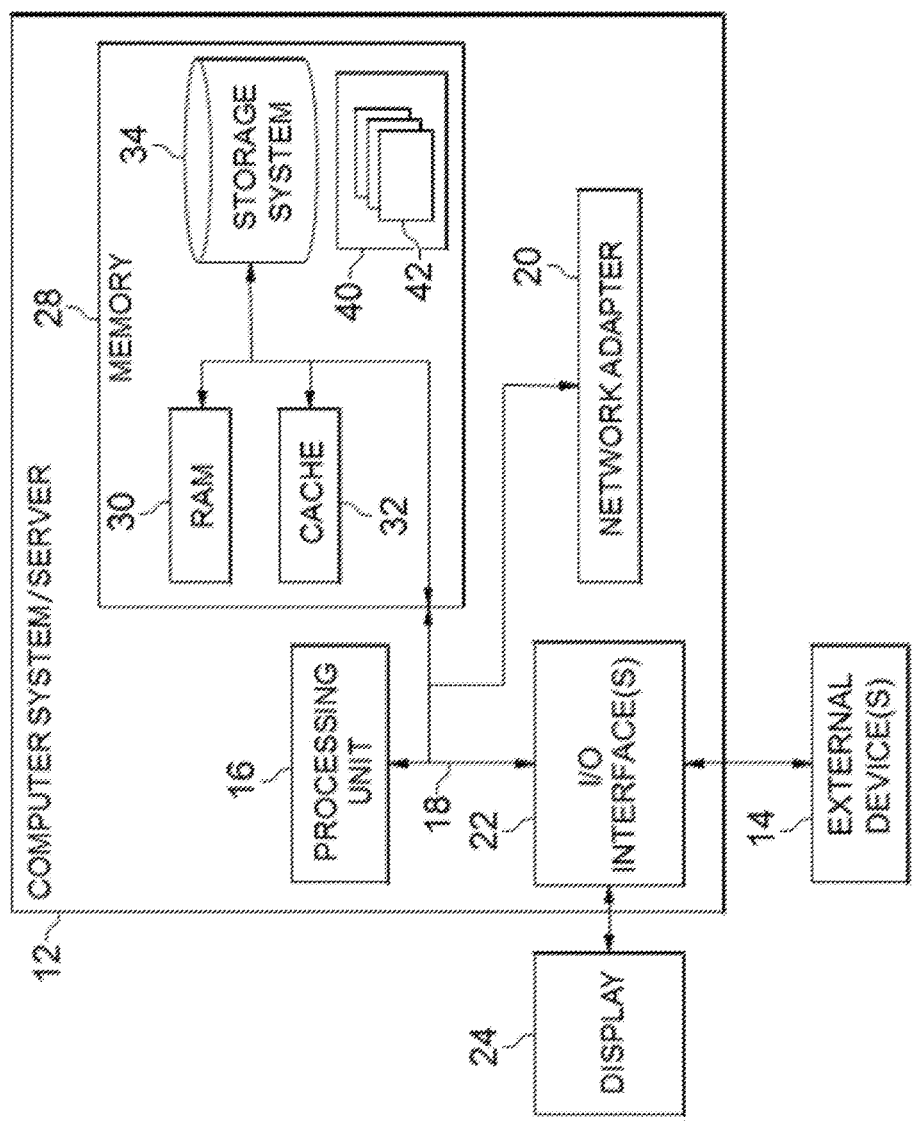
FIG. 1 depicts a schematic of an example of a cloud computing node according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node 10 is shown according to some embodiments of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth herein.

In cloud computing node 10 there is a computer system/server 12, which can be a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
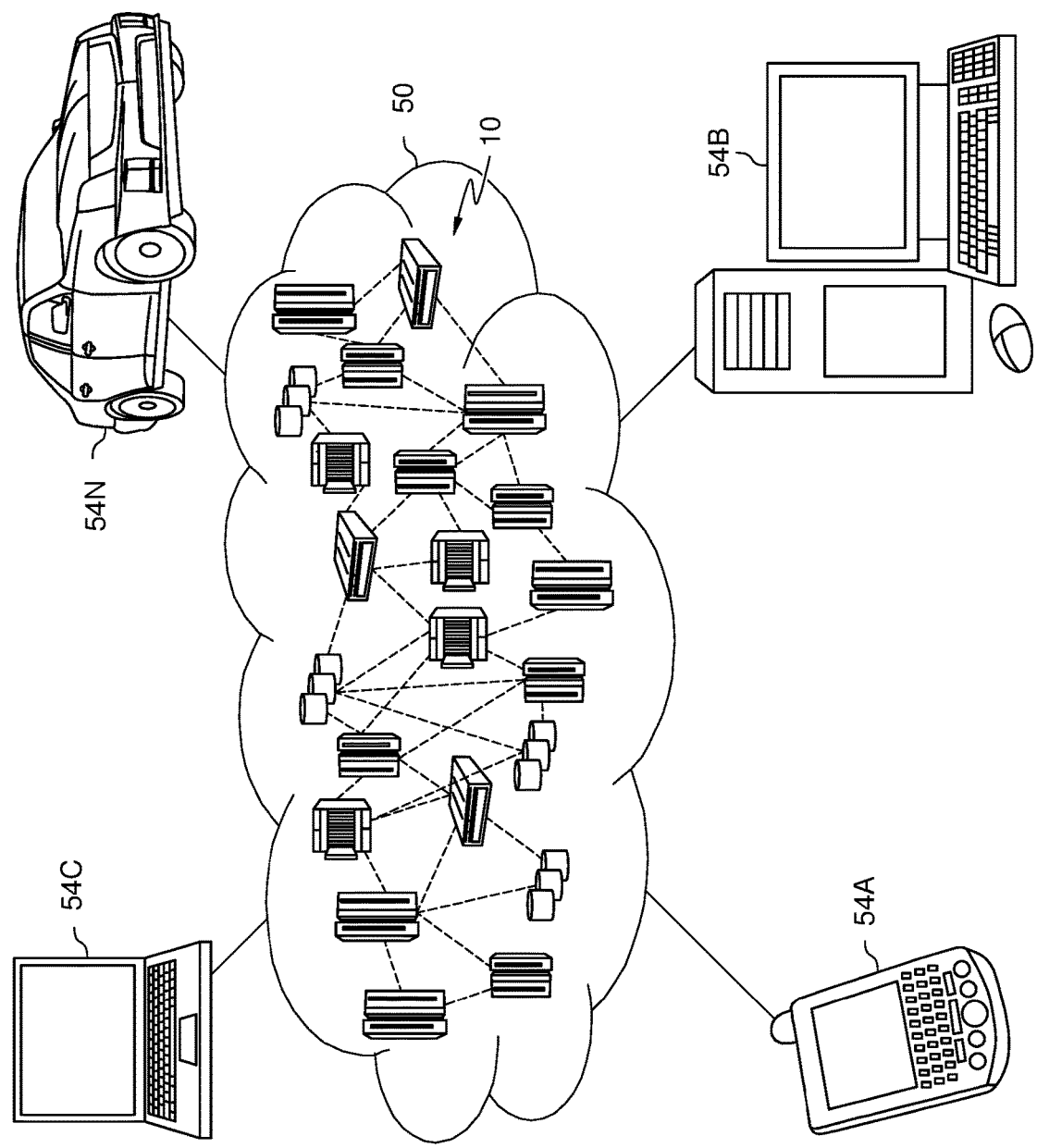
FIG. 2 depicts a cloud computing environment according to some embodiments of the present disclosure.

Referring now to FIG. 2, illustrative cloud computing environment 50 is depicted according to some embodiments of the present disclosure. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
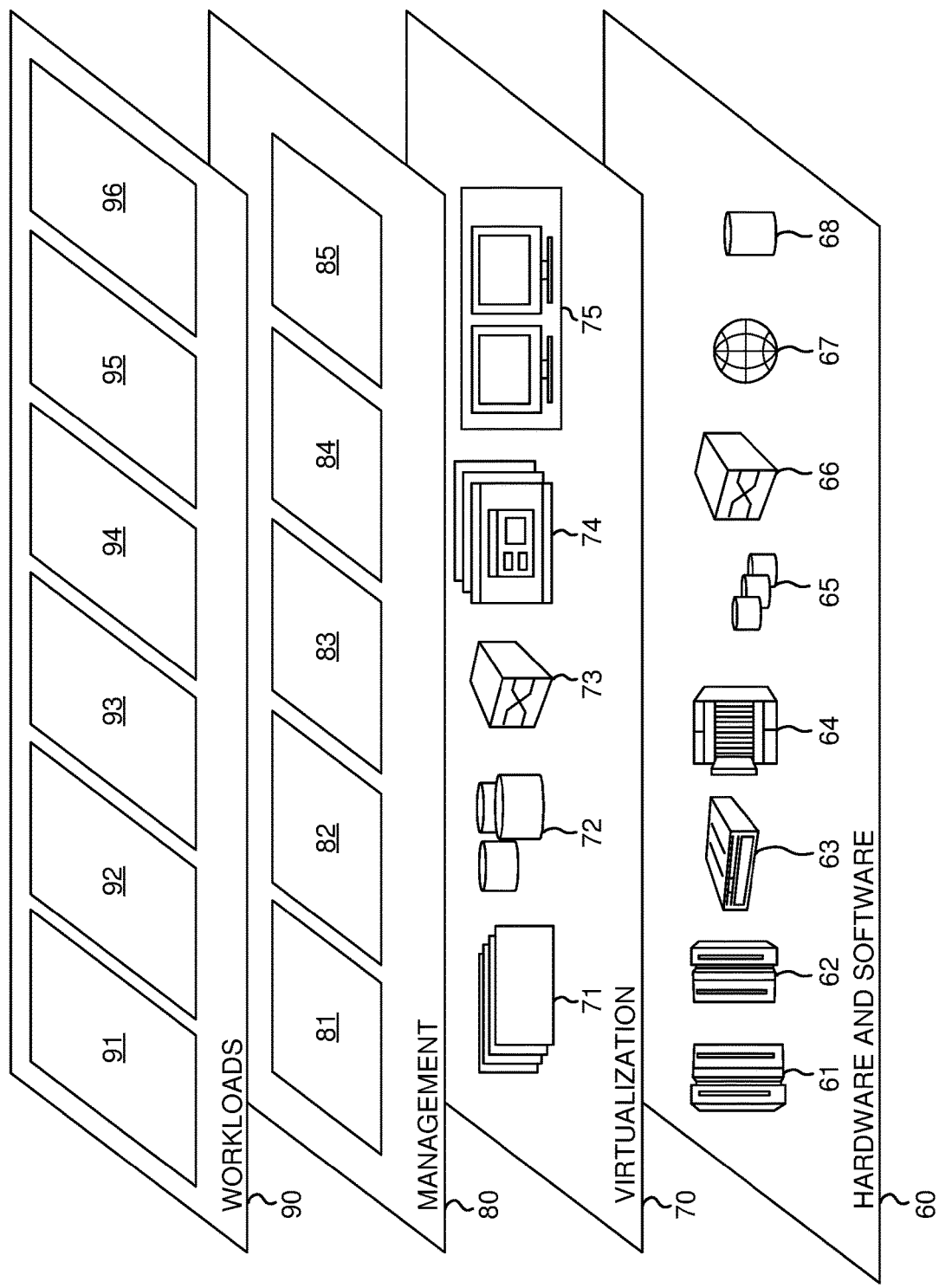
FIG. 3 depicts abstraction model layers according to some embodiments of the present disclosure.

Referring now to FIG. 3, a set of functional abstraction layers provided by cloud computing environment 50 (FIG. 2) is shown according to some embodiments of the present disclosure. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and command engine 96. Command engine 96 can be consistent with one or more of command engine 401, command engine 530, or command engine 540 of FIGS. 4 and 5 respectively, described in more detail below.

A current command tool can be pre-compiled as an executable binary file related to the operation system. Users may use the hard-code command tool via CLI (Command Line interface). Moreover, when a configuration changes or application APIs evolves, the hard-code command tool may need to be updated accordingly. Command tool developers have to change the hard code of command tools, then re-compile them, and release them to users. Therefore, the hard-code command tool development is labor intensive and tedious work. Updating the hard-code command tool may require significant effort of developers and corresponding management overhead. Therefore, it is advantageous to reduce command tool development cost.

Instead of hard-code command tool implementations, the present disclosure provides a command description file describing the function logic of commands. The command description file can be parsed to acquire information for executing one or more operations comprised in the command description file. The command description file can be developed in any script language. Even users without any software development experience can write the command description file. If there is any evolvement for the command tool, it can be convenient for the developers or users to modify command description files. Therefore, command tool development cost can be greatly reduced.

Figure 4:
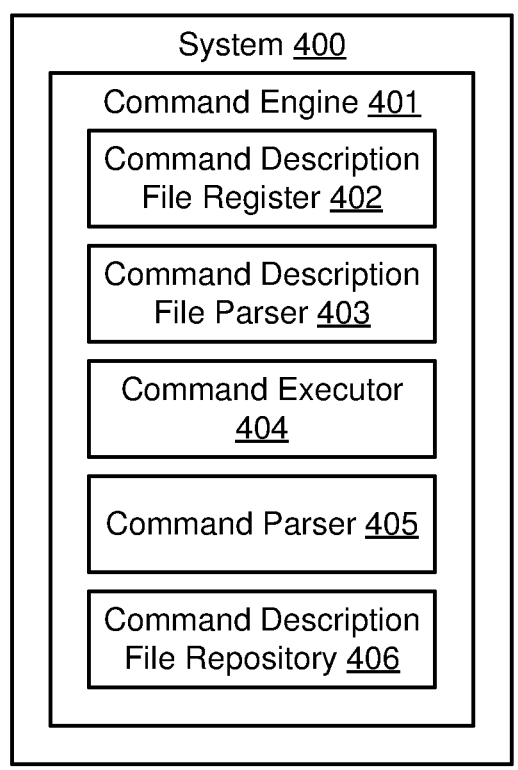
FIG. 4 depicts an example system according to some embodiments of the present disclosure.

With reference now to FIG. 4, an example System 400 is depicted according to some embodiments of the present disclosure. System 400 includes Command engine 401.

System 400 may employ Command engine 401 for creating a command and executing the command. Command engine 401 may use a command to provide the necessary parameters for Command executor 404. Command engine 401 may include Command description file register 402 for registering a command description file, Command description file parser 403 for parsing a command description file, Command executor 404 for executing a command, Command parser 405 for parsing a command, and Command description file repository 406 for storing command description files. It should be noted that System 400 according to embodiments of this disclosure could be implemented by computer system/server 12 of FIG. 1.

Figure 5:
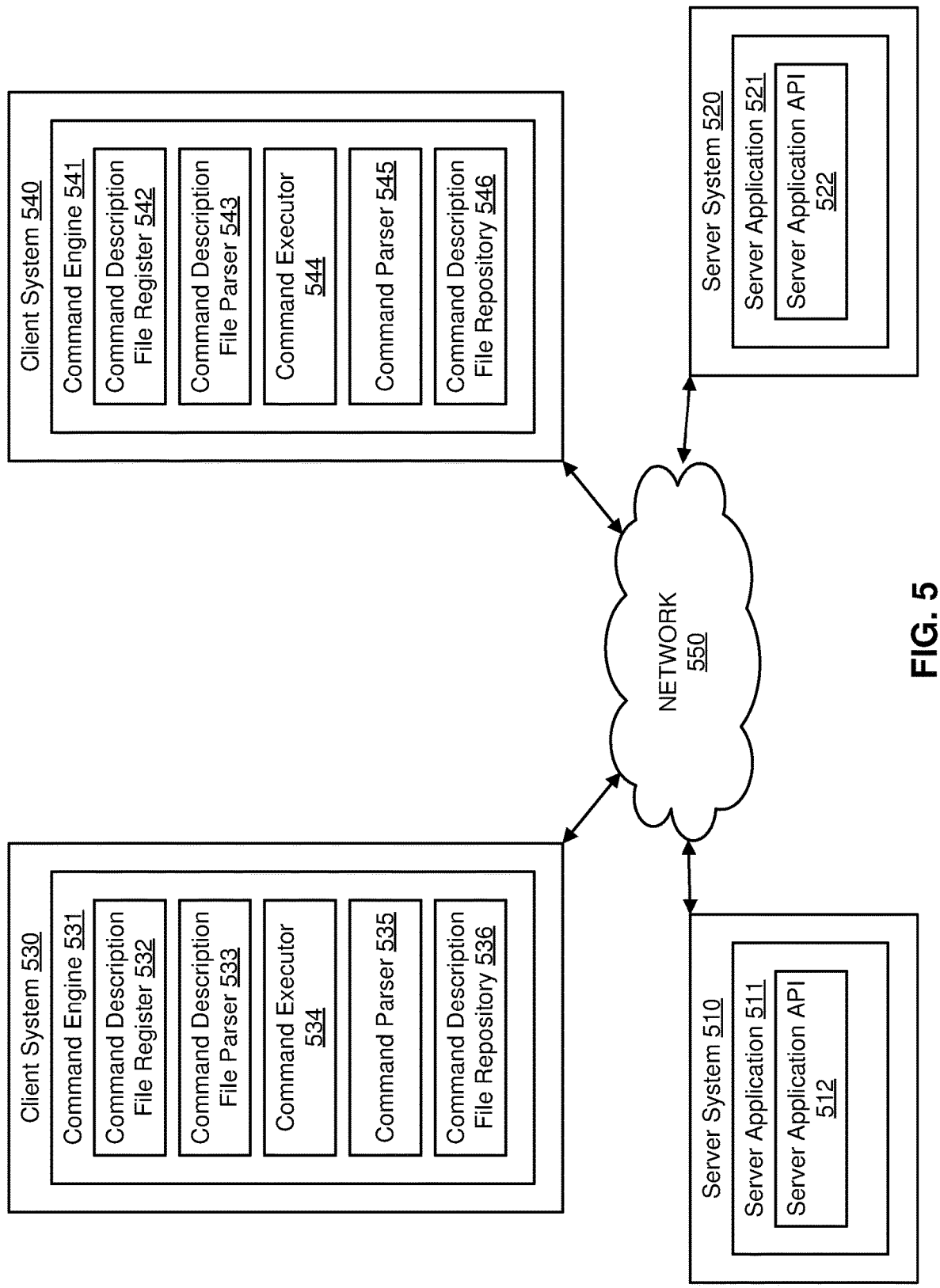
FIG. 5 depicts an example system architecture according to some embodiments of the present disclosure.

With reference now to FIG. 5, depicted is an example System architecture 500 according to some embodiments of the present disclosure. System architecture 500 may include Server systems 510 and 520 coupled to Client systems 530 and 540 over a network 550. Although two server systems (510 and 520) and two client systems (530 and 540) are illustrated in FIG. 5, any number of server systems and client systems may be present in System architecture 500. Server systems 510 and 520 and Client systems 530 and 540 may each be a computing device such as Computer system/server 12 illustrated in FIG. 1, including being a desktop computer, a laptop computer, a portable computing device, etc. System architecture 500 can be implemented in a cloud computing environment such as illustrated in FIG. 2. Each of client systems 530 and 540 may be consistent with System 400 of FIG. 4.

Server systems 510 and 520 may include Server applications 511 and 521, respectively. A server application may comprise one or more related processes to be executed by one or more servers to deliver certain functionality. Server application 511 may include Server application API 512. Server application 521 may include Server application API 522. A server application API may enable the exchange of data between a server system and a client system as well as allow a client system to access certain server system resources of a server system. Client systems 530 and 540 may include Command engines 531 and 541, respectively. Client systems 530 and 540 may employ Command engines 531 and 541, respectively, for interacting with a server application running on Server systems 510 and 520 (including Server applications 511 and 521). Command engines 531 and 541 may use commands to invoke APIs and provide the necessary parameters for the server applications. Command engines 531 and 541 may include Command description file registers 532 and 542, Command description file parsers 533 and 543, Command executors 534 and 544, Command parsers 535 and 545, Command description file repositories 536 and 546, respectively as shown in FIG. 5. The function of Command engines 531 and 541 is the same as Command engine 401. The function of Command description file registers 532 and 542 is the same as Command description file register 402. The function of Command description file parsers 533 and 543 is the same as Command description file parser 403. The function of Command executors 534 and 544 is the same as Command executor 404. The function of Command parsers 535 and 545 is the same as Command parser 405. The function of Command description file repositories 536 and 546 is the same as Command description file repository 406.

Figure 6:
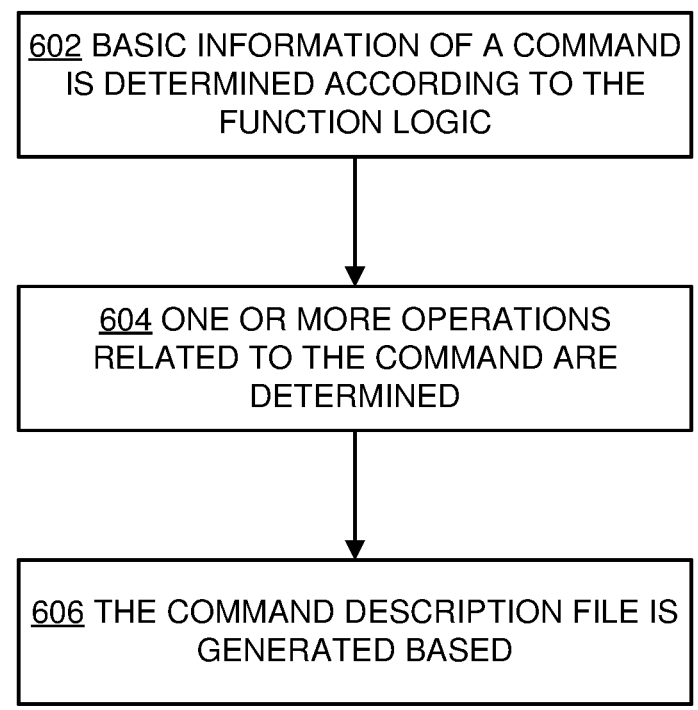
FIG. 6 depicts an example method for generating a command description file corresponding to a command according to some embodiments of the present disclosure.

A command description file can be generated according to the function logic of a command. FIG. 6 depicts an example method for generating a command description file corresponding to a command according to some embodiments of the present disclosure. At 602, basic information of a command is determined according to the function logic of a command. Herein, the basic information of a command description file may include a command name, input and output information of a command, and parameters of a command. At 604, one or more operations related to the command are determined according to the function logic of the command. At 606, the command description file is generated based on the basic information of the command and the one or more operations related to the command.

Figure 7:
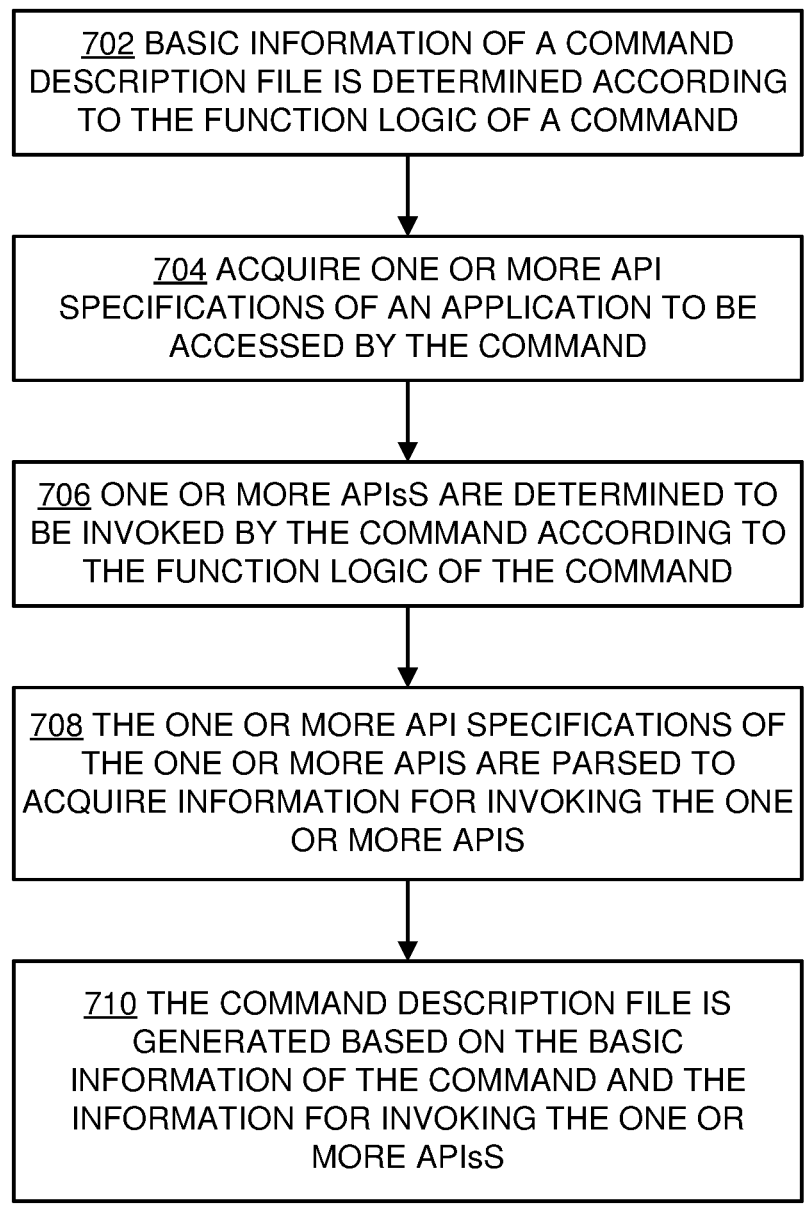
FIG. 7 depicts an example method for generating a command description file corresponding to a command requesting invoking APIs of an application according to some embodiments of the present disclosure.

FIG. 7 depicts an example method for generating a command description file corresponding to a command requesting invoking APIs of an application installed on a server system according to some embodiments of the present disclosure. At 702, basic information of a command description file is determined according to the function logic of a command. At 704, one or more API specifications of an application to be accessed by the command are acquired. There are many ways to acquire the one or more API specifications of an application. For example, the one or more API specifications of an application can be downloaded from the web site of the application. At 706, one or more APIs are determined to be invoked by the command according to the function logic of the command. At 708, the one or more API specifications of the one or more APIs are parsed to acquire information for invoking the one or more APIs. At 710, the command description file is generated based on basic information of the command and the information for invoking the one or more APIs. As mentioned above, the basic information of a command description file may include a command name, input and output information of a command, and parameters of a command. The information for invoking one or more APIs may include input and output information of the one or more APIs and an invoking sequence of the one or more APIs. The basic information of the command and the information for invoking API can be recorded in the command description file according to a predefined format, for example the format shown in Example 1 below. In some embodiments, operation 702 corresponds to operation 602 of FIG. 6. Operations 704-708 correspond to an embodiment of operation 604 of FIG. 6. Operation 710 corresponds to the operation 606 of FIG. 6.

The following describes an example embodiment of generation of a command description file corresponding to a command invoking APIs of an Application "Helm" installed on a server system according to present disclosure and with reference to Example 1 below. Server system 510 can include an Application "Helm," which can correspond to Server application 511. Client system 530 may employ an example command named "Helm version" to interact with the Application "Helm" running on Server system 510. The function logic of the command "Helm version" is to get version information and metadata from the Application "Helm." According to the predefined function logic of a command, the basic information of the command may include the application name "Helm," command name "version," a function description, and help information. This basic information can be determined as at operations 602 of FIG. 6 and 702 of FIG. 7. Client system 530 may request to acquire API specifications of the Application "Helm" installed on Server system 510. The API specifications of the Application "Helm" can be acquired for example by downloading it from the website or receiving it from Server system 510. This acquisition can occur at operation 704 of FIG. 7. According to the API specifications of the Application "Helm," API-1 can provide version information of the Application "Helm," and API-2 can provide metadata information of the Application "Helm". It can be determined, such as at operation 706 of FIG. 7, that API-1 and API-2 are to be invoked by the command "Helm version." The API specifications of API-1 and API-2 are then parsed, such as at operation 708 of FIG. 7, to acquire information for invoking the API-1 and API-2. The information for invoking the API-1 and API-2 includes API addresses, input and output information, and an invoking sequence. Taking API-1 as an example, the API address is http://9.1.2.23:45678/heml/version. The input parameter is in a form of query string. The key of the query string is "full" and the value of query string is "true" or "false". The output parameter is in a form of a string indicating version information of Application "Helm." Taking API-2 as an example, the API address is http://9.1.2.23:45678/heml/matadata. There is no input parameter for API-2. The parsed output parameter is in the form of a string indicating metadata information of the Application "Helm." The invoking sequence is that API-1 is invoked firstly and then API-2 is invoked. An example "Command Description File A" corresponding to the command "Helm version" is generated, such as at operation 710 of FIG. 7, based on the basic information of the command and the information for invoking API-1 and API-2. The basic information of the command and the information for invoking API-1 and API-2 can be recorded in the command description file according to a predefined format, for example, the format shown in Example 1 below. According to the description of Command Description File A shown as below, Line 2 indicates the application name "Helm." Line 3 indicates the command function name "version." Line 4 indicates the command version "1.0.11." Line 5 describes the function of the command. Lines 6-8 defines the format of the command. Lines 9-11 describes the definitions of input parameters of the command. Lines 12-24 describes the method to invoke API-1 and API-2. The Command Description File A in XML is only illustrative but not intended to suggest any limitation to the scope of a command description file. It can be understood by those of skill in the art, that a command description file can be developed in any type of script language such as XML, ASP, PHP, CGI, JSP, and so on.

---

Line 1 <Command>
Line 2 <app>helm</app>
Line 3 <fucname>version</fucname>
Line 4 <cmdversion>1.0.11</cmdversion>
Line 5 <desc>Show the client system version and metadata for Helm.</desc>
Line 6 <usage>
Line 7 helm version [flags]
Line 8 </usage>
Line 9 <flags>
Line 10 <flag name="--full" id="full" type="booean" default="false" desc="server version only"/>
Line 11 </flags>
Line 12 <elements>
Line 13 <start id="001">Start</start>
Line 14 <link srcr="001" target="002">
Line 15 <rest id="002" method="GET" showresult="true"
Line 16 url="http://9.1.2.23:45678/heml/version?full=S{flag.full}">
Line 17 </rest>
Line 18 <link src="002" target="003">
Line 19 < rest id="003" method="GET" showresult="true">
Line 20 url="http://9.1.2.23:45678/heml/metedata">
Line 21 </rest>
Line 22 <link src="003" target="004">
Line 23 <end id="004">End</end>
Line 24 </elements>
Line 25 </Command>

---

Example 1

According to some embodiments of the present disclosure, command description files can be developed by application developers. The application developers can publish the command description files on one or more websites. In such embodiments, users can download command description files from the one or more websites. According to other embodiments of present disclosure, the command description files can be developed by users and the command description files can be acquired from local client systems. According to some embodiments, the acquired command description files can be stored in Command description file repositories 536 and 546 of FIG. 5.

The plurality of command description files can be registered in Client systems 530 and 540 of FIG. 5 after the plurality of command description files are acquired. Commands description files can be registered in Command description file registers 532 and 542 of FIG. 5.

Figure 8:
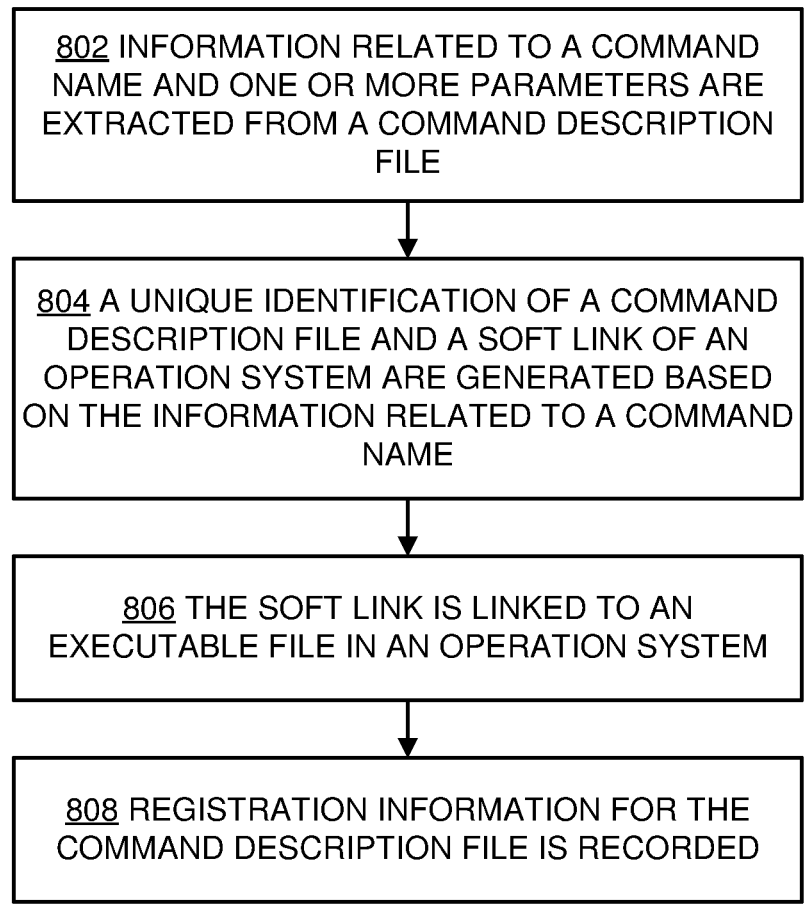
FIG. 8 depicts an example method for registering a command description file according to some embodiments of the present disclosure.

FIG. 8 describes an example method for registering a command description file according to some embodiments of the present disclosure. At 802, information related to a command name and parameters are extracted from a command description file. Herein, the information related to a command name may be predefined by those who develop the command. According to some embodiments, the command name may be predefined as an application name. In such embodiments, information related to a command name may include an application name. An application name can be extracted from a command description file. According to other embodiments, the command name may be predefined as a combination of an application name and a command function name. In this case, information related to a command name may include an application name and a command function name. Since a command description file is formed according to a predefined format, an application name and a command function name can be extracted from a command description file according to the predefined format. Taking the above Command Description File A in Example 1 for example, the application name "Helm" and the command function name "version" can be extracted from the Command Description File A. The command name can be determined to be "Helm version." Furthermore, input parameter "—full" can be extracted from the Command Description File A. A format of the command can be determined based on the information related to the command name and parameters. The format of the command can be determined to be combination of a command name and parameters. Taking the above Command Description File A in Example 1 for example, the format of the command can be determined to be "Helm version—full."

At 804, a unique identification (UI) of a command description file and a soft link of an operation system are generated based on the information related to a command name. A generation rule of a UI of a command description file can be predefined by those who develop the command. According to some embodiments of the present disclosure, a UI of a command description file can be generated based on the information related to a command name, for example, an application name and/or a command function name. According to one example embodiment, the UI of the Command Description File A can be "Helm version." The soft link, can be a special kind of file that points to another file, much like a symbolic link in Linux® or a shortcut in Windows® or a Macintosh® alias. Unlike a hard link, a soft link does not contain the data in the target file. It simply points to another entry somewhere in the file system. According to some embodiments of the present disclosure, a soft link can be generated based on the information related to a command name for example, an application name. Taking the above Command Description File A in Example 1 for example, a symbolic link can be created by Linux® command "ln -s/usr/local/bin/helm/clisystem" based on the application name "Helm."

At 806, the soft link is linked to an executable file in an operation system. Taking the above Command Description File A in Example 1 for example, the created symbolic link can be put into an operation system executable path in the client system such as "/usr/local/bin." The entry of Command engine 431 of FIG. 4 can be triggered by executing the executable file in the operation system "/usr/local/bin/helm" when users enters the command "Helm version—full" in the client system.

At 808, registration information for a command description file is recorded. According to some embodiments, the registration information of a command description file may include UI and access address of the command description file. According to some embodiments, besides UI and access address, the registration information of a command description file may further comprise at least one of the following: version information, source address, registration time, and update information. The registration information for each command description file can be recorded in a registry in Command description file register 422 of FIG. 4. Table 1 shows the example registration information recorded for Command Description File A.

description file in a command description file register. If the UI exists in the registration information, it indicates that the command description file corresponding to the command has been registered in the command description file register. Then the command description file corresponding to the command can be accessed according to the access address of the command description file in the registration information of the command description file. According to one example embodiment, the UI "helm version" of the command description file corresponding to the command "helm version—full" can be generated. The UI "helm version" can be used as key words to be searched in above Table 1. If the UI "helm version" can be found in Table 1, it indicates that the command description file corresponding to the UI "helm version" has been registered in the command description file register. Additionally, the Command Description File A can be determined to the registered CLI description file corresponding to the command "helm version—full." The Command Description File A can be accessed according to access address information in Table 1.

At 908, information for executing one or more operations included in the command description file is acquired by parsing the retrieved command description file. Taking the above Command Description File A in Example 1 for example, in command description file parser 533 of FIG. 5,

TABLE 1

| UI | Version | Source address | Access address | Registration time |
|---|---|---|---|---|
| Helm version | 1.0.11 | http://company.com/service/cli/desc/helm_version_1.0.11.desc | /opt/cli/repo/helm_version_1.0.11.desc | 2018-05-02 T13:11:59 |

Figure 9:
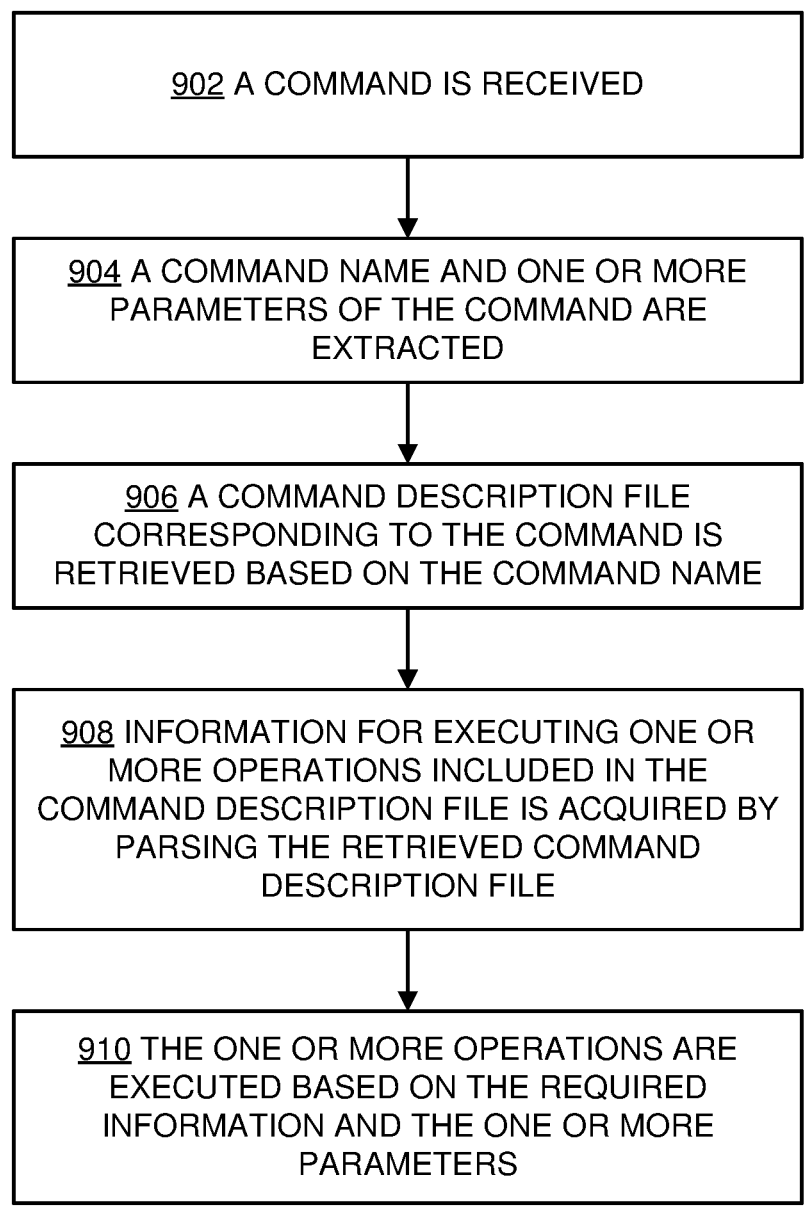
FIG. 9 depicts an example method for executing a command according to some embodiments of the present disclosure.

FIG. 9 describes an example method for executing a command according to some embodiments of the present disclosure. As depicted in FIG. 9, at 902, a command is received. At 904, a command name and one or more parameters of the command are extracted. At 906, a command description file corresponding to the command is retrieved based on the command name. At 908, information for executing one or more operations included in the command description file is acquired by parsing the retrieved command description file. At 910, the one or more operations are executed based on the required information and the one or more parameters.

At 902, a command is received. An executable file in the operation system can be located in response to receiving the command. The entry of a command engine can be triggered by executing the executable file in the operation system. According to one example embodiment, the entry of Command engine 531 of FIG. 5 can be triggered by executing the executable file "/usr/local/bin/helm" when the command "helm version—full" is received in the client system.

At 904, a command name and one or more parameters are extracted from the command. According to one example embodiment, in Command parser 535 of FIG. 5, the command name "helm version" can be extracted from the received command "helm version—full." Furthermore, input parameters "—full" can be extracted from the command "helm version—full."

At 906, a command description file corresponding to the command is retrieved based on the command name. According to a predefined rule, the UI of the command description file corresponding to the command can be generated based on the extracted information related to the command name. It can be determined whether the generated UI is recorded in the registration information for the plurality of command the Command Description File A is parsed to acquire information for invoking API-1 and API-2 including API addresses, input and output information, and an invoking sequence. In this example, the API address of API-1 is http://9.1.2.23:45678/heml/version; the input parameters of API-1 are "—full;" the output parameters are a string indicating version information of Application "Helm;" the API address of API-2 is http://9.1.2.23:45678/heml/matadata; the parsed output parameters are a string indicating metadata information of the Application "Helm;" and the invoking sequence is that API-1 is invoked firstly and then API-2 is invoked.

At 910, the one or more operations are executed based on the required information and the one or more parameters. Taking the above Command Description File A in Example 1 for example, in Command executor 534 of FIG. 5, API-1 and API-2 can be invoked based on the input and output information, invoking sequence of API-1 and API-2, and input parameter "—full." API-1 and API-2 can be invoked by accessing acquired API addresses. The input parameter "—full" can be applied to API-1 as input parameter. Finally, version information and metadata of the Application "Helm" can be output as an execution result of the command "helm version—full."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
receiving a command to invoke one or more APIs of an application;
extracting, from the command, a command name of the command and one or more parameters of the command;
retrieving a command description file corresponding to the command based on the command name,
the command description file describing function logic of the command;
acquiring information for executing one or more operations included in the command description file by parsing the retrieved command description file; and
executing, by a processor, the one or more operations based on the acquired information and the one or more parameters,
wherein the command description file is registered before the receiving the command.

2. The method of claim 1, wherein the acquiring information for executing one or more operations included in the command description file by parsing the retrieved command description file further comprises:
acquiring information for invoking the one or more APIs of the application.

3. The method of claim 2, wherein the executing the one or more operations based on the acquired information and the one or more parameters further comprises:
invoking the one or more APIs of the application based on the acquired information for invoking the one or more APIs of the application and the one or more parameters.

4. The method of claim 1, wherein the command description file is generated according to the function logic of the command.

5. The method of claim 4, wherein the command description file is generated by the following actions:
determining basic information of the command according to the function logic of the command;
determining one or more operations related to the command according to the function logic of the command; and
generating the command description file based on the basic information of the command and the one or more operations related to the command.

6. The method of claim 4, wherein wherein the command description file is generated by the following actions:
determining basic information of the command according to the function logic of the command;
acquiring one or more API specifications of the application;
determining one or more APIs of the application to be invoked by the command according to the function logic of the command;
parsing the one or more API specifications to acquire information for invoking the one or more APIs for the command;
generating the command description file based on the basic information of the command and the information for invoking the one or more APIs.

7. The method of claim 6, wherein the information for invoking the one or more APIs further comprises: input information and output information of the one or more APIs and an invoking sequence of the one or more APIs.

8. The method of claim 1, wherein the command description file is registered by the following actions:
acquiring the command description file;
extracting information related to the command name and the one or more parameters from the command description file;
generating a unique identification (UI) for the command description file and a soft link based on the information related to the command name;
linking the soft link to an executable file in an operation system; and
recording registration information for the command description file, the registration information comprising the UI and an access address for the command description file.

9. The method of claim 8, wherein the retrieving the command description file corresponding to the command based on the command name further comprises:
generating a UI of the command description file corresponding to the command based on the command name;
determining whether the UI is recorded in registration information of a plurality of command description files;
determining there exists the command description file corresponding to the command in response to determining the UI being recorded in the registration information of the plurality of command description files; and
retrieving the command description file corresponding to the command.

10. A computer system comprising:
one or more processors;
a memory coupled to the one or more processors, wherein the memory comprises program instructions that when executed by the one or more processors implements a method comprising:
receiving a command;
extracting a command name of the command and one or more parameters of the command;
retrieving a command description file corresponding to the command based on the command name,
the command description file describing function logic of the command;
acquiring information for executing one or more operations included in the command description file by parsing the retrieved command description file; and
executing the one or more operations based on the acquired information and the one or more parameters,
wherein the command description file is registered before the receiving the command.

11. The computer system of claim 10, wherein the command is to invoke one or more APIs of an application, and wherein the acquiring information for executing one or more operations included in the command description file by parsing the retrieved command description file further comprises:
acquiring information for invoking the one or more APIs of the application.

12. The computer system of claim 11, wherein the executing the one or more operations based on the acquired information and the one or more parameters further comprises:
invoking the one or more APIs of the application based on the acquired information for invoking the one or more APIs of the application and the one or more parameters.

13. The computer system of claim 10, wherein the command description file is generated according to the function logic of the command.

14. The computer system of claim 10, wherein the command description file is registered by the following actions:
- acquiring the command description file;
- extracting information related to the command name and the one or more parameters from the command description file;
- generating a unique identification (UI) for the command description file and a soft link based on the information related to the command name;
- linking the soft link to an executable file in an operation system; and
- recording registration information for the command description file, the registration information comprising the UI and an access address for the command description file.

15. The computer system of claim 14, wherein the retrieving the command description file corresponding to the command based on the command name further comprises:
- generating a UI of the command description file corresponding to the command based on the command name;
- determining whether the UI is recorded in registration information of a plurality of command description files;
- determining there exists the command description file corresponding to the command in response to determining the UI being recorded in the registration information of the plurality of command description files; and
- retrieving the command description file corresponding to the command.

16. A computer program product comprising a computer readable storage medium having program instructions embodied therewith, the program instructions executable by one or more processors to cause the one or more processors to perform actions of:
- receiving a command;
- extracting a command name of the command and one or more parameters of the command;
- retrieving a command description file corresponding to the command based on the command name, the command description file describing function logic of the command;
- acquiring information for executing one or more operations included in the command description file by parsing the retrieved command description file; and
- executing the one or more operations based on the acquired information and the one or more parameters,
- wherein the command description file is registered before the receiving the command.

17. The computer program product of claim 16, wherein the command is to invoke one or more APIs of an application, and wherein the acquiring information for executing one or more operations included in the command description file by parsing the retrieved command description file further comprises:
- acquiring information for invoking the one or more APIs of the application.

18. The computer program product of claim 17, wherein the executing the one or more operations based on the acquired information and the one or more parameters further comprises:
- invoking the one or more APIs of the application based on the acquired information for invoking the one or more APIs of the application and the one or more parameters.

* * * * *